W. J. NESBITT.
HEEL CUTTER.
APPLICATION FILED SEPT. 18, 1917.
1,275,078.
Patented Aug. 6, 1918.
2 SHEETS—SHEET 1.
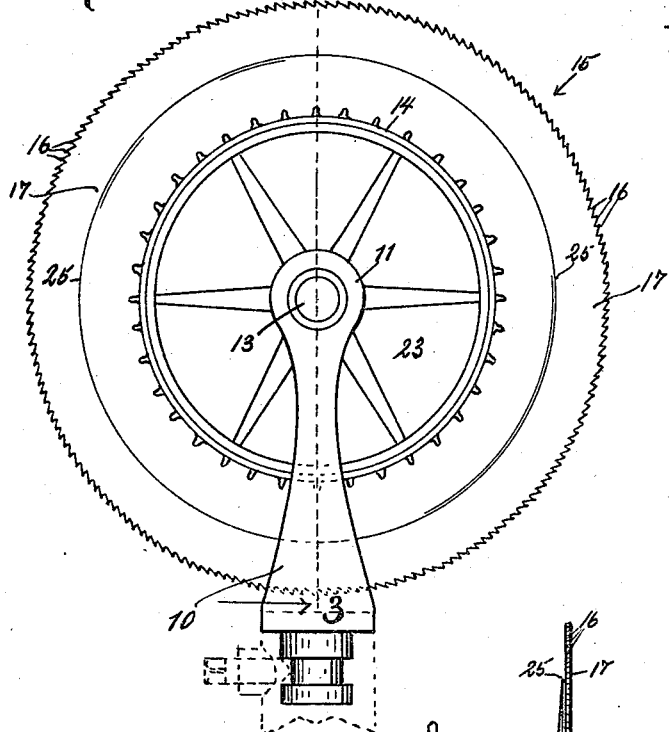
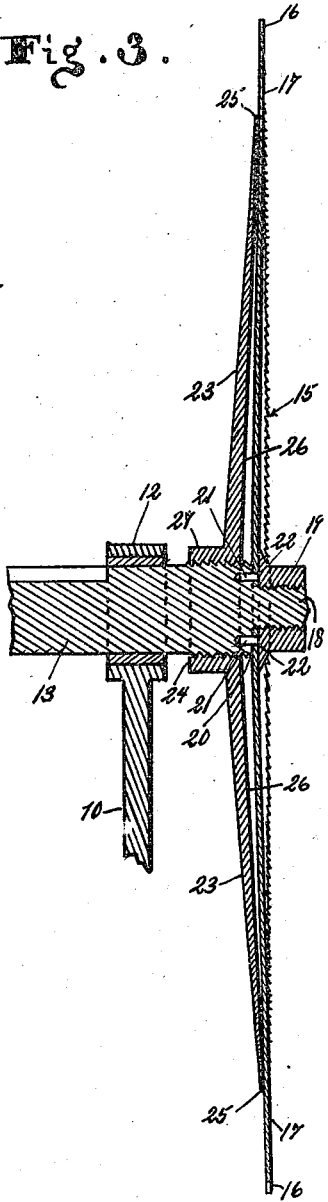
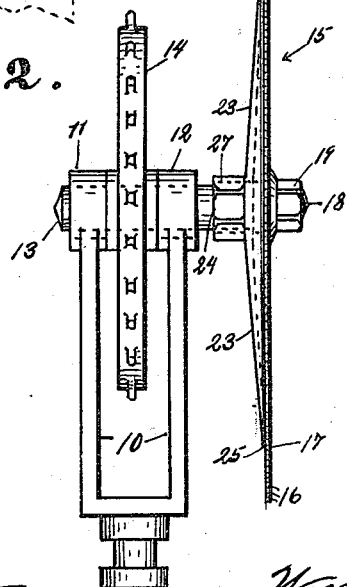
Witness:
W. M. Gentle.
Inventor.
William J. Nesbitt
By
Alex. H. Lidders
Attorney.

W. J. NESBITT.
HEEL CUTTER.
APPLICATION FILED SEPT. 18, 1917.

1,275,078.

Patented Aug. 6, 1918.
2 SHEETS—SHEET 2.

Witness:
W. M. Gentle.

Inventor.
William J. Nesbitt
By Alex. H. Sidders,
Attorney.

UNITED STATES PATENT OFFICE.

WILLIAM J. NESBITT, OF LOS ANGELES, CALIFORNIA.

HEEL-CUTTER.

1,275,078.      Specification of Letters Patent.      Patented Aug. 6, 1918.

Application filed September 18, 1917. Serial No. 192,216.

*To all whom it may concern:*

Be it known that I, WILLIAM J. NESBITT, a citizen of the United States of America, residing at Los Angeles, county of Los Angeles, State of California, have invented a certain new and useful Heel-Cutter; and I do hereby declare the following to be a full, clear, and exact description of the invention, such as will enable others skilled in the art to which it appertains to make and use the same.

This invention relates to heel cutters; more particularly to improvements in the heel cutter which is disclosed in my application Serial No. 172,537, filed June 2, 1917.

The main object of this invention is to provide a novel and improved construction in which the dished stiffening plate is mounted on a sleeve so that the stiffening plate can be adjusted relatively to the circular saw by adjustment of the sleeve longitudinally of the shaft.

Other objects and the advantages of the invention will be apparent to those skilled in the art from a careful consideration of the following description of preferred forms of construction embodying the invention, taken in connection with the accompanying drawings in which—

Figure 4:
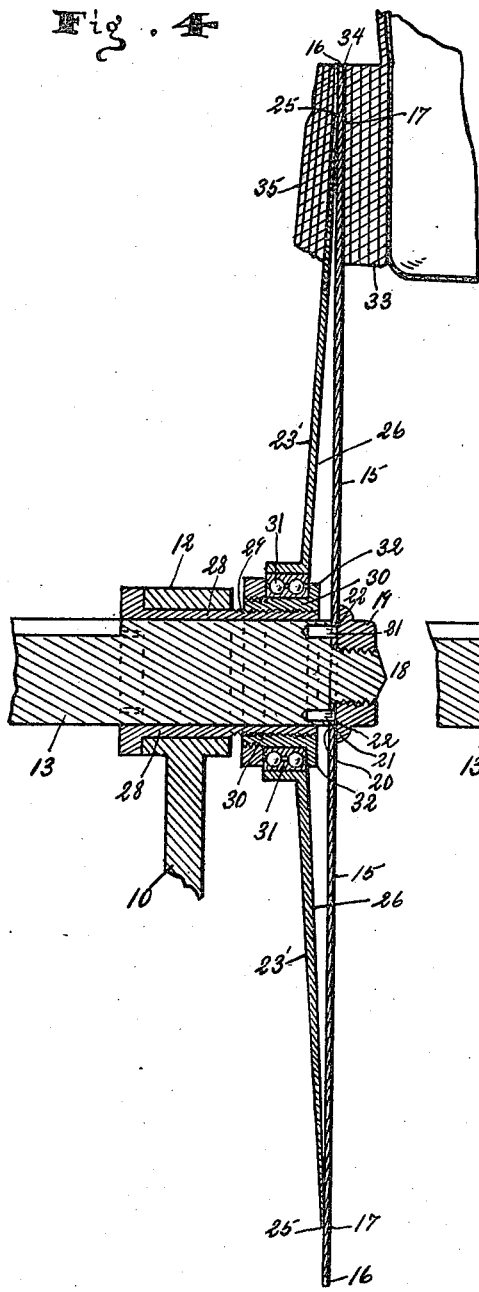
Figure 5:
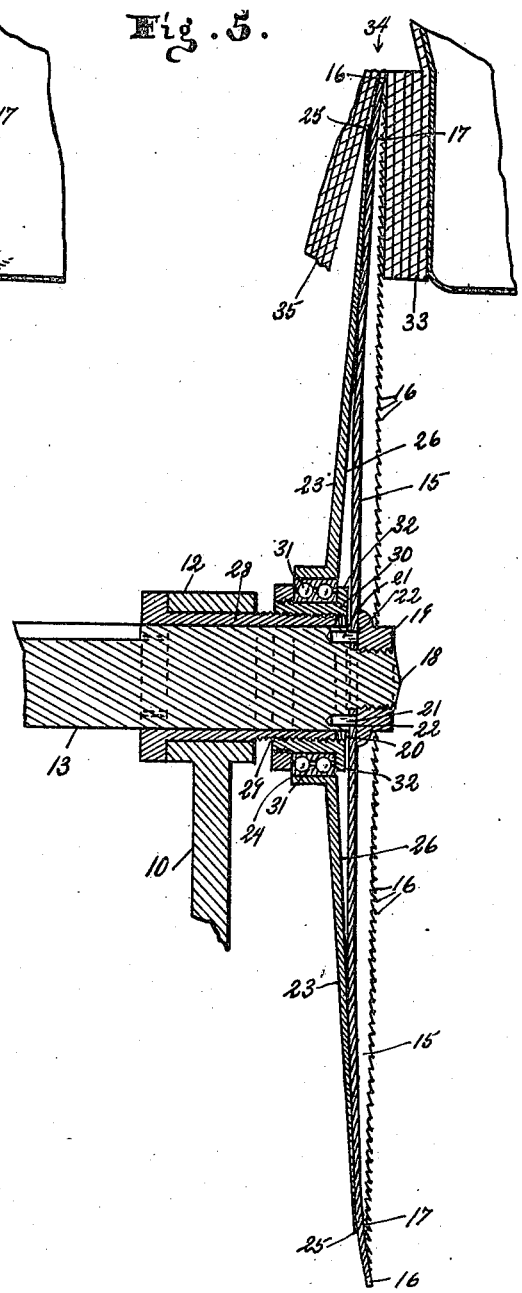

Figure 1 is a side elevational view of the heel cutter and its mounting; Fig. 2 is an end elevational view of the same; Fig. 3 is an enlarged broken sectional view taken on the line 3—3 of Fig. 1; Fig. 4 is a broken sectional view showing another form of construction embodying the invention; and Fig. 5 is a similar view with the stiffening plate in changed position.

In the drawings similar parts are designated by like reference numerals.

Referring to Figs. 1, 2 and 3 of the drawings, the bracket 10 is provided with the bearings 11 and 12 for the shaft 13 which may be operated by suitable means such as the sprocket wheel 14 which latter is mounted fast on the shaft 13 between the bearings 11 and 12.

In order to obtain the best results in cutting the leather and nails in the heel of a boot or shoe the circular saw 15 must be comparatively thin, and it is preferably of the type that is ordinarily used for sawing metal. The circular saw 15 is provided with teeth 16 on its marginal portion 17, and it has its central portion fitted on the threaded reduced end portion 18 of the shaft 13. A nut 19 on the reduced portion 18 is screwed up tightly against the front face of the circular saw 15 to press the rear face of the circular saw 15 against the shoulder 20 on the shaft 13. The circular saw 15 is preferably locked to the shaft 13 by means of the pins 21 which extend forwardly from the shoulder 20 and fit in the openings 22 on the central portion of the circular saw 15.

The stiffening plate 23 is mounted on the sleeve 24 so that it can be adjusted longitudinally of the shaft 13; said stiffening plate being of gradually reduced thickness from its central portion to its periphery 25 which latter is disposed adjacent to the marginal portion 17 of the circular saw 15. The front face 26 of the stiffening plate 23 is dished and disposed adjacent to the rear face of the circular saw 15. As shown in this instance the sleeve 24 is threaded to screw on the shaft 13, and said sleeve 24 has a portion 27 thereof formed so that it can be turned by a wrench to adjust the stiffening plate 23 relatively to the circular saw 15.

In the form of the construction shown in Figs. 4 and 5, the bushing 28 of the shaft bearing 12 has a threaded extension 29 on which is fitted the threaded sleeve 30 on which the central portion of the stiffening plate 23' is mounted; a suitable ball bearing 31 being provided for the stiffening plate 23' and interposed between the sleeve 30 and the stiffening plate 23'. The sleeve 30 has thereon a collar 32 provided with flat faces so that the sleeve 30 can be turned by a wrench to adjust the stiffening plate 23' relatively to the circular saw 15.

From the foregoing it will be understood that the sleeve 27 or the sleeve 30 can be adjusted in order to move the stiffening plate against the circular saw 15 and dish the latter to the desired degree. Unless the front face of the circular saw 15 is dished so that the marginal portion 17 of the saw 15 clears the intact part 33 of the heel 34, the saw 15 will not cut in a straight line against the intact part 33 because of the nails and uneven texture of the heel 34 which deflects the teeth 16 toward the slice 35 which is being cut off of the heel and bears with less resistance against the teeth 16 than does the intact part 33. The plate stiffens the comparatively thin circular saw 15, and it inclines the marginal portion 17 forwardly so that the points of the teeth 16 are directed toward the intact part 33 of the heel 34 so that the teeth 16 are adapted to spring back against the intact part 33 when they are deflected from said intact part.

I claim:

1. A heel cutter comprising the combination of a shaft, a threaded sleeve carried by and adjustable longitudinally of the shaft, a circular saw mounted on said shaft, and a dished stiffening plate mounted on said sleeve, said stiffening plate being of gradually reduced thickness from its central portion to its periphery which latter is disposed adjacent to the marginal portion of the circular saw as and for the purpose set forth.

2. The combinaion with a shaft, of a bushing fitted on said shaft, a sleeve arranged on said bushing and adjustable longitudinally of said shaft, a circular saw mounted on said shaft, and a dished stiffening plate mounted on said sleeve, substantially as and for the purpose set forth.

In testimony whereof I have signed my name to this specification at Los Angeles, county of Los Angeles, State of California, this 6th day of September A. D. 1917.

WILLIAM J. NESBITT.

Copies of this patent may be obtained for five cents each, by addressing the "Commissioner of Patents, Washington, D. C."